United States Patent
Lowry

[15] 3,704,924
[45] Dec. 5, 1972

[54] REMOVABLE WEAR PLATE FOR FIFTH WHEEL

[72] Inventor: Randy W. Lowry, 3373 E. Fairmont, Fresno, Calif. 93726

[22] Filed: March 12, 1971

[21] Appl. No.: 123,578

[52] U.S. Cl. ........................... 308/136, 280/433 X
[51] Int. Cl. ........................................ B62d 53/08
[58] Field of Search ............... 280/433; 308/136, 137

[56] References Cited

UNITED STATES PATENTS 3,174,812   3/1965   Widmer .............................. 308/136
3,337,277   8/1967   Arnold ............................... 308/136

Primary Examiner—Leo Friaglia
Attorney—Huebner & Worrel

[57] ABSTRACT

A replaceable wear plate for the fifth wheels of automotive vehicles having engaged bearing surfaces. The wear plate is a substantially flat sheet of disposable material having a low coefficient of friction releasably secured in fixed position on one of the bearing surfaces for engagement with the other bearing surface and is removable from its respective surface for replacement.

3 Claims, 5 Drawing Figures

PATENTED DEC 5 1972

RANDY W. LOWRY
INVENTOR

Huebner & Worrel
ATTORNEYS

RANDY W. LOWRY
INVENTOR

Huebner & Worrel
ATTORNEYS

REMOVABLE WEAR PLATE FOR FIFTH WHEEL

BACKGROUND OF THE INVENTION

The present invention relates to coupling devices and more particularly to such a device commonly known as a fifth wheel for use on an automotive vehicle for the coupling of a trailer thereto.

The trucking industry utilizes automotive vehicles, commonly referred to as truck rigs consisting of a motorized tractor and one or more trailers connected in tracking relation thereto for the transportation of heavy loads over great distances. It is well known that in order to achieve the maximum economic benefit from the use of such equipment it is desirable to maintain it in as nearly continuous use as possible. Unfortunately such equipment requires a substantial amount of maintenance to keep it in operating condition and to avoid breakdowns enroute.

Such vehicles commonly employ a coupling device known as a fifth wheel in order releasably to couple the trailer to the tractor. Such fifth wheels provide releasably engaged bearing surfaces, one being mounted on the rear portion of the truck and the other being mounted on the underside of the forward portion of the trailer. The bearing surface of the tractor supports the weight of the trailer resting against it and acts as a surface against which the bearing surface of the trailer rotates as necessary during towing operations. Lubrication of the engaged bearing surfaces is normally provided by the application of a lubricant, usually grease, to the bearing surface of the tractor. Because of long hours of use and the rather rapid dissipation of the lubricant, frequent disconnection of the trailer from the tractor for reapplication of the lubricant is required in order to maintain the equipment in optimum working condition. This reapplication process, when done correctly, requires steam cleaning of the bearing surfaces to remove residue and accumulated dirt prior to the reapplication of the lubricant. Since nearly continuous operation is economically desirable and since the task is onerous and time consuming, such maintenance is often not performed as frequently as would be desirable. The result is aggravated wearing of the bearing surfaces and progressively worse handling characteristics for the truck rig. This is costly to the trucking business, and annoying to the operator of the vehicle. Further, when the bearing surfaces become worn, they must be replaced. This necessitates removal and replacement of the fifth wheels, a time consuming and expensive undertaking.

SUMMARY OF THE INVENTION

An object of the present invention is therefore to provide an improved means of lubricating the engaged bearing surfaces of the fifth wheel of a truck rig.

Another object is to provide a means of lubricating such engaged bearing surfaces which does not require frequent reapplications of lubricant.

Another object is to provide such a lubricating means which minimizes the accumulation of abrasive residue between the engaged bearing surfaces.

Another object is to provide such a lubricating means which is inexpensive and is easy to replace.

Other objects are to minimize the maintenance, expense, and nonoperational time heretofore required in the utilization of truck-trailer combinations.

Further objects and advantages are to provide improved elements and arrangements thereof in a device for the purposes described which is dependable, economical, durable, and fully effective in accomplishing its intended purposes.

DESCRIPTION OF THE PREFERRED EMBODIMENTS

Figure 1:
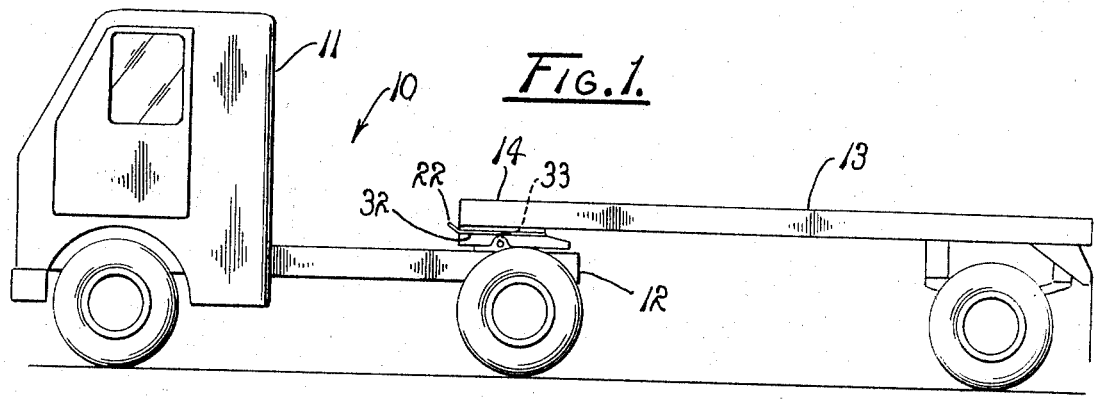
FIG. 1 is a side elevation of a conventional truck comprising a tractor and a trailer combination providing a fifth wheel.

Referring in greater detail to the drawings, in FIG. 1 a typical operational environment for the device of the present invention is represented as an automotive vehicle commonly referred to as a truck rig 10 consisting generally of a motorized tractor 11, having a rear portion 12, and a trailer 13, having a forward portion 14. The trailer is designed to be drawn in trailing relation by the tractor. The trailer is connected to the tractor by means of a coupling mechanism commonly called a fifth wheel 19 mounted between the rear portion of the tractor and the forward portion of the trailer.

The fifth wheel 19 provides a substantially flat upwardly facing lower bearing plate 20, which is secured by means of a pair of mounts 21 on the rear portion 12 of the tractor, and a substantially flat downwardly facing upper bearing plate 22, which is mounted on the underside of the forward portion 14 of the trailer. The lower bearing plate has a forward edge 23 and a rearward edge 24. Extending rearwardly from the rearward edge are sloped guides or ramps 25. The lower bearing plate and guides are preferably one continuous casting. Mounted centrally of the lower bearing plate is a draft connection 30. A substantially V-shaped passage 31 is provided in the lower bearing plate from its rearward edge to the draft connection. The upper bearing plate 22 of the trailer affords a downwardly facing upper bearing surface 32 and a centrally disposed, downwardly extending tongue 33.

Figure 2:
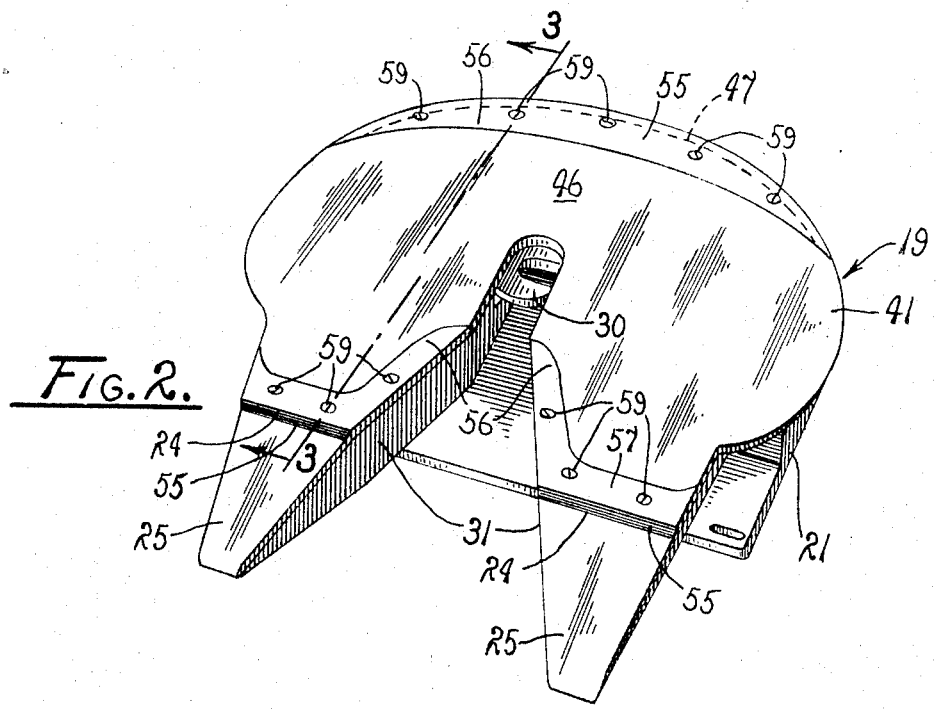
FIG. 2 is a perspective view of a lower bearing plate of a first form of the present invention illustrating the arrangement of a wear plate thereon.
Figure 3:
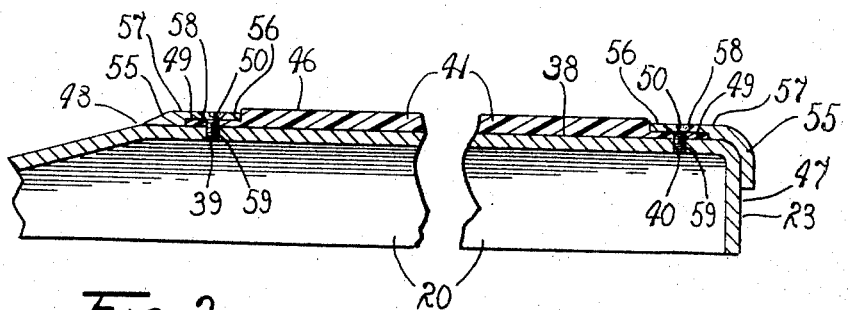
FIG. 3 is a fragmentary, transverse, vertical section taken on line 3—3 of FIG. 2.

The device of the present invention provides a modified lower bearing surface, generally indicated at 38, for the lower bearing plate 20 of the fifth wheel 19. The first form of the present invention is shown in FIGS. 2 and 3. The lower bearing surface of the fifth wheel is a flat upwardly facing surface extending arcuately about the draft connection 30. A plurality of threaded screw holes 39 are provided in the lower bearing plate through the lower bearing surface positioned in a predetermined pattern adjacent to the rearward edge 24 on each side of the passage 31. A plurality of threaded screw holes 40 are also provided in the lower bearing plate through the lower bearing surface in a predetermined pattern adjacent to the forward edge 23. A substantially flat, arcuate wear plate 41 having dimensions corresponding to those of the lower bearing surface is positioned in covering relation thereto. The wear plate consists essentially of a sheet of vinyl, polyethylene, or polypropylene plastic, or some similar durable material having a very low coefficient of friction. The thickness of the plate is not critical but one quarter inch is excellently suited to the purpose. The wear plate affords an upper surface 46, a forward peripheral edge 47 and a rearward peripheral edge 48. The upper surface is rabbeted adjacent to the forward and rearward peripheral edges to define upwardly facing flanges 49. A plurality of screw holes 50 are provided in the flanges extending through the wear plate in a pattern and of diameters corresponding to the screw holes 39 and 40. A set of securing plates 55 having downwardly facing covering flanges 56 and upper surfaces 57 are positioned at the forward and rearward peripheral edges of the wear plate so that the covering flanges 56 are in facing engagement with the flanges 49 of the wear plate, as best shown in FIG. 3. The securing plates are constructed of high impact plastic, or metal. The covering flanges 56 and flanges 49 are of an aggregate thickness appreciably less than that of the wear plate so that the upper surface of the wear plate extends above the securing plates. A plurality of countersunk screw holes 58 are provided in the securing plates in positions corresponding to the screw holes 39, 40 and 50. Cap screws 59 are positioned in the screw holes 50 and 58 and threadably received in the screw holes 39 and 40 so as firmly to retain the securing plates and wear plate in covering relation to the lower bearing surface 38, as shown best in FIG. 3.

Figure 4:
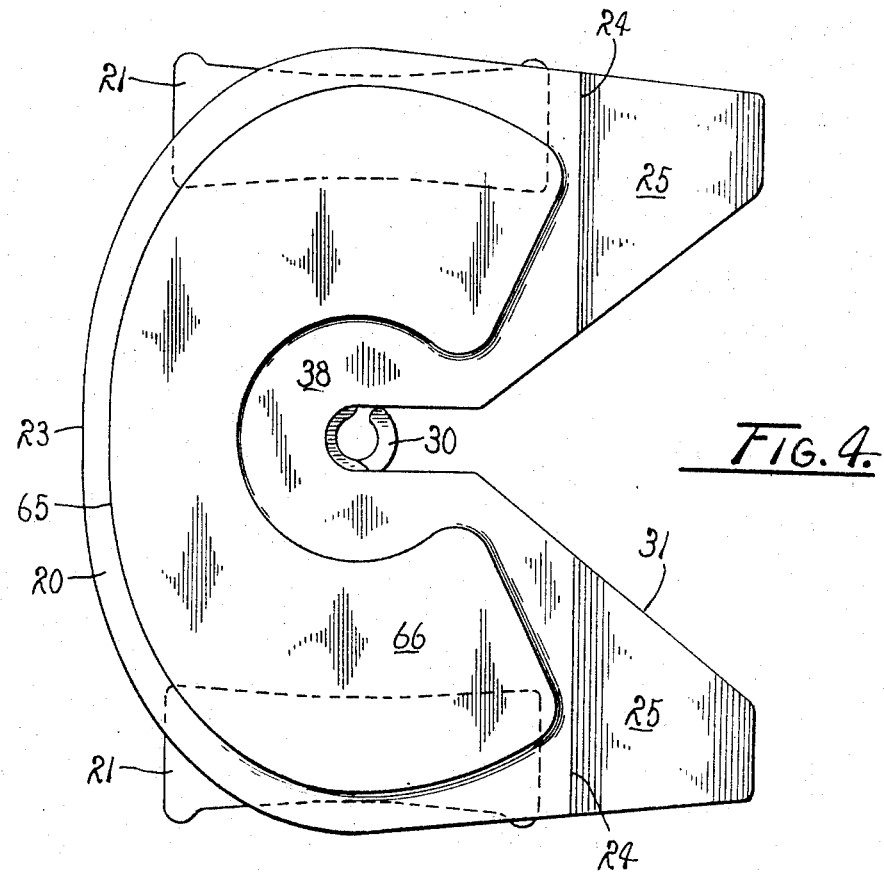
FIG. 4 is a top plan view of the lower bearing plate of a second embodiment of the present invention illustrating the arrangement of a wear plate thereon.
Figure 5:
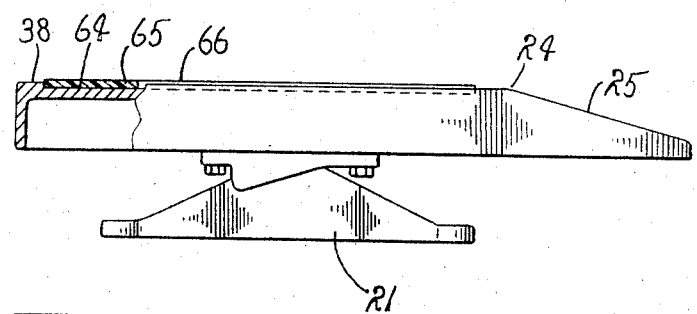
FIG. 5 is a side elevation of the lower bearing plate of FIG. 4 with a portion of the structure thereof broken away for illustrative convenience.

The second embodiment of the invention is shown in FIGS. 4 and 5. The lower bearing surface 38 of the lower bearing plate 20, as therein disclosed, provides a recess 64 of a constant minimal depth extending arcuately about the draft connection 30, as best shown in FIG. 4. An arcuate wear plate 65, having an upper surface 66 and overall dimensions closely approaching those of the recess, is positioned in the recess and retained securely in said position by a suitable adhesive bonding agent, not shown. The wear plate is constructed of a sheet of durable material having a low coefficient of friction, as described above in regard to the wear plate 41 of the first embodiment of the invention. The wear plate 65 is of a thickness appreciably greater than the depth of the recess so that when in position in the recess its upper surface 66 is disposed above the lower bearing surface 38, as shown in FIG. 5.

OPERATION

The operation of the devices of the present invention is believed to be clearly apparent and is briefly summarized at this point. The fifth wheel 19 is operated in the conventional manner. When it is desired to couple the trailer 13 to the tractor 11, the tractor is backed toward the forward portion 14 of the trailer until the upper bearing plate 22 of the trailer is contacted by the sloped guides 25 of the tractor. As rearward movement is slowly continued, the sloped guides slide under the upper bearing plate of the trailer and the tongue 33 of the trailer is received in the V-shaped passage 31. Rearward movement of the tractor is continued until the tongue locks in the draft connection 30 of the tractor and the upper bearing plate of the trailer is above the lower bearing plate of the tractor. In the present invention, when the trailer is so connected to the tractor, the upper bearing surface 32 rests in facing engagement against the upper surface 46 of the wear plate 41 in the first embodiment of the invention, or against the upper surface 66 of the wear plate 65 in the second embodiment of the invention. Thereafter, the tractor can be employed to pull the trailer for use in normal trucking operations.

The wear plates 41 and 65 possess low coefficients of friction and in no significant respect are subject to distorting tortional stresses incident to relative pivotal movement of the tractor 11 and trailer 13. In both forms of the invention, the upper bearing plates 22 supported on the wear plates turn freely with respect to their wear plates with substantially less friction than normally encountered. Neither requires lubrication and thus neither acquires any surface deposits of sand, dust, dirt or debris to increase wear. Since the wear plates have no adhesive qualities, the accumulations of abrasive residue, which rapidly occur when grease is used as the lubricant, is avoided. Therefore, wearing from this factor is no longer a problem. Due to the fact that in both embodiments of the invention the wear plates are securely retained in position on the lower bearing surface, the wear plates cannot buckle or tear during operation.

Although the wear plates of the present invention wear much more slowly than the wearing surfaces of conventional fifth wheels and need to be replaced much less frequently, they nevertheless ultimately require replacement. In the first embodiment the wear plate 41 may be allowed to wear down to the level of the securing plates. In the second embodiment, the wear plate 65 may be allowed to wear down to the level of the lower bearing surface. When replacement is needed, it can be rapidly accomplished in both embodiments of the invention. The trailer 13 is first disconnected from the tractor 11. In the first embodiment the cap screws 59 are removed from the lower bearing plate 20. The securing plates 55 and the old wear plate 41 are removed, and a new wear plate is positioned on the lower bearing surface 38. Subsequently, the securing plates and screws are reassembled on the lower bearing surface as before and the trailer then reconnected for operation. Such replacement can be accomplished in a very small fraction of the time required to replace conventional fifth wheels and at an even smaller fraction of the expense. Down time from this cause is virtually eliminated.

In the second embodiment of the invention the wear plate 65 is simply peeled out of the recess 64 by braking the seal of the adhesive bonding agent. A new wear plate is, then, adhesively secured in the recess using a new application of the bonding agent. As before, the replacement is quickly, easily and economically accomplished.

The conventional periodic steam cleaning to remove accumulated lubricant and abrasives is completely avoided. The conventional periodic application of lubricant is obviated. The need for equipment for these purposes is no longer present. The accumulation of sand, dirt, dust and debris by conventionally lubricated fifth wheels no longer occurs.

The first embodiment of the invention has an additional attribute. Present day grease lubricated fifth wheels can easily be converted to this form of the invention. The boring of the threaded screw holes 39 and 40 in the lower bearing plate 20 in predetermined positions and the acquisition of the wear plate 41, securing plates 55 and cap screws 59 is all that is required for conversion. Once the conventional fifth wheel has been cleaned, the conversion can be quickly, easily and inexpensively performed.

Although the invention has been herein shown and described in what is conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. In combination with the fifth wheel of an automotive vehicle having a substantially flat bearing surface, a wear plate disposed flatly against the bearing surface having an exposed surface and a peripheral edge, portions of the edge of the bearing surface being rabbeted to provide a flange of reduced thickness; a securing plate fitted in facing engagement with the flange of the wear plate with the aggregate thickness of the flange and securing plate being less than the thickness of the wear plate; and means releasably mounting the securing plate on the bearing surface in clamping relation to the flange of the wear plate.

2. In combination with a fifth wheel having an upwardly facing substantially flat bearing surface providing a centrally disposed draft connection with a substantially V-shaped passage from an edge of the bearing surface to the draft connection; a substantially flat arcuate wear plate having an upper surface and a peripheral edge, portions of the edge of the upper surface being rabbeted to define a flange; a securing plate having a lower surface and a peripheral edge, portions of the edge of the lower surface being rabbeted to provide a flange fitted in facing engagement with the flange of the wear plate, said flanges in aggregate thickness being appreciably less than the thickness of the plate; and means releasably mounting the securing plate on the bearing surface with the flange thereof in clamping relation to the flange of the wear plate with the wear plate disposed symmetrically of the draft connection and opposite to the passage therefrom.

3. The combination of claim 2 in which the fifth wheel has engaged bearing surfaces and the wear plate is constructed of a disposable material having a relatively high degree of lubricity whereby a trailer tongue can be engaged in the draft connection for drafting operations with the wear plate operating to lubricate movement of the engaged bearing surfaces so as to avoid rapid wearing during use without the necessity of frequent applications of grease to the bearing surfaces.

* * * * *